United States Patent
Nam et al.

(10) Patent No.: US 10,063,887 B2
(45) Date of Patent: *Aug. 28, 2018

(54) VIDEO DECODING APPARATUS AND METHOD FOR DECODING MULTI-VIEW VIDEO

(71) Applicant: LG ELECTRONICS INC., Seoul (KR)

(72) Inventors: Junghak Nam, Seoul (KR); Jungdong Seo, Seoul (KR); Sunmi Yoo, Seoul (KR); Sehoon Yea, Seoul (KR); Jin Heo, Seoul (KR); Taesup Kim, Seoul (KR); Moonmo Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

This patent is subject to a terminal disclaimer.

(21) Appl. No.: 15/028,649

(22) PCT Filed: Oct. 20, 2014

(86) PCT No.: PCT/KR2014/009859
§ 371 (c)(1),
(2) Date: Apr. 11, 2016

(87) PCT Pub. No.: WO2015/057037
PCT Pub. Date: Apr. 23, 2015

(65) Prior Publication Data
US 2016/0255369 A1    Sep. 1, 2016

Related U.S. Application Data

(60) Provisional application No. 61/892,447, filed on Oct. 18, 2013, provisional application No. 61/892,462,
(Continued)

(51) Int. Cl.
*H04N 19/52* (2014.01)
*H04N 19/597* (2014.01)
(Continued)

(52) U.S. Cl.
CPC ......... *H04N 19/597* (2014.11); *H04N 19/176* (2014.11); *H04N 19/182* (2014.11); *H04N 19/52* (2014.11)

(58) Field of Classification Search
CPC .... H04N 19/176; H04N 19/182; H04N 19/52; H04N 19/597
(Continued)

(56) References Cited

U.S. PATENT DOCUMENTS

2012/0075436 A1* 3/2012 Chen .................. H04N 13/0048
348/51
2013/0114725 A1* 5/2013 Lou ........................ H04N 19/52
375/240.16
(Continued)

FOREIGN PATENT DOCUMENTS

CN    101523436 A    9/2009
CN    102867288 A    1/2013
(Continued)

OTHER PUBLICATIONS

Tikekar et al, A 249-Mpixels/s HEVC video-decoder chip for 4K Ultra-HD application (Year: 2014).*
(Continued)

*Primary Examiner* — Shan E Elahi
(74) *Attorney, Agent, or Firm* — Dentons US LLP

(57) ABSTRACT

A method inducing video information required for decoding a current block by entropy-decoding a bitstream; inducing a first disparity vector based on a neighboring block of the current block in the same view by using the video information, inducing a second disparity vector by using the first
(Continued)

disparity vector and a reference view depth, and inducing a third disparity vector using the difference between the first disparity vector and the second disparity vector; inducing a prediction sample of the current block by using one of the first disparity vector, the second disparity vector, or the third disparity vector; and applying filtering to a current picture which has been restored using the prediction sample.

9 Claims, 18 Drawing Sheets

Related U.S. Application Data filed on Oct. 18, 2013, provisional application No. 61/892,450, filed on Oct. 18, 2013.

(51) Int. Cl.
*H04N 19/176* (2014.01)
*H04N 19/182* (2014.01)

(58) Field of Classification Search
USPC .................................................. 375/240.16
See application file for complete search history.

(56) References Cited

U.S. PATENT DOCUMENTS

| 2013/0177084 A1* | 7/2013 | Wang | H04N 19/00684 375/240.16 |
| 2014/0161189 A1* | 6/2014 | Zhang | H04N 19/597 375/240.16 |
| 2014/0169474 A1* | 6/2014 | Kang | H04N 13/0022 375/240.16 |
| 2014/0254682 A1* | 9/2014 | Chen | H04N 19/597 375/240.16 |
| 2015/0030073 A1* | 1/2015 | Chen | H04N 19/597 375/240.16 |
| 2015/0172714 A1* | 6/2015 | Wu | H04N 19/597 375/240.12 |

FOREIGN PATENT DOCUMENTS

| KR | 10-2013-0016172 A | 2/2013 |
| WO | 2012-086963 A1 | 6/2012 |
| WO | 2013-032073 A1 | 3/2013 |
| WO | 2013-055148 A2 | 4/2013 |
| WO | 2013-133587 A1 | 9/2013 |

OTHER PUBLICATIONS

Nam: "CE2 related: Modification of disparity vector derivation based on depth-oriented disparity vector", JCT3V-F0164, Joint Collaborative Team on 3D Video Coding Extensions of ITU-T SG16 WP3 and ISO/IEC JTC1/SC29/WG11, 6th Meeting, Geneva, CH, Oct. 25-Nov. 1, 2013.

Lizhang: "3D-HEVC test Model 5", JCT3V-E1005, Joint Collaborative Team on 3D Video Coding Extension development of ITU-T SG16 WP3 and ISO/IEC JTC1/SC29/WG11, 5th Meeting, Vienna, AT, Jul. 27-Aug. 2, 2013.

* cited by examiner

Final AMVP candidates:

NBDV: Disparity vector from neighboring blocks
DoNBDV: NBDV to which PDM update is applied

FIG. 15

AMVP Candidates: | A0 |

Final AMVP candidates: | A0 | DoNBDV |

VIDEO DECODING APPARATUS AND METHOD FOR DECODING MULTI-VIEW VIDEO

This application is a National Stage Entry of International Application No. PCT/KR2014/009859, filed on Oct. 20, 2014, and claims the benefit of and priority to Provisional Application Nos. 61/892,447, 61/892,462, and 61/892,450 filed Oct. 18, 2013, all of which are hereby incorporated by reference in their entirety for all purposes as if fully set forth herein.

BACKGROUND OF THE INVENTION

Field of the Invention

The present invention relates to a video coding technique, and, more particularly, to a 3D video image coding technique.

Related Art

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, 3D video using multi-views have a high correlation between views having the same picture order count POC. Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for encoding/decoding a multi-view video, and information need for encoding and/or decoding of a current view can be obtained. For example, a block to be decoded in a current view can be predicted or decoded with reference to a block in different view.

SUMMARY OF THE INVENTION

The present invention provides a method and an apparatus for more efficiently inducing a disparity vector using information and a depth of a neighboring block.

The present invention is aimed at regulating a storage unit of a disparity vector capable of reducing complexity and increasing a coding efficiency.

The present invention further provides a method and an apparatus for increasing a coding efficiency by efficiently predicting a motion vector using a disparity vector.

An embodiment of the present invention provides video decoding apparatus for decoding a multi-view video, the apparatus including: an entropy decoding unit configured to induce video information required for decoding a current block by entropy-decoding a bitstream; a memory configured to store pictures referred to decode the current block; a prediction unit configured to induce a first disparity vector based on a neighboring block of the current block in the same view by using the video information, to induce a second disparity vector by using the first disparity vector and a reference view depth, to induce a third disparity vector using a difference between the first disparity vector and the second disparity vector, and to induce a prediction sample of the current block by using one of the first disparity vector, the second disparity vector, and the third disparity vector; and a filter unit configured to apply filtering to a current picture which has been reconstructed using the prediction sample.

Another embodiment of the present invention provides a video decoding method for decoding a multi-view video, the method including: inducing video information required for decoding a current block by entropy-decoding a bitstream; inducing a first disparity vector based on a neighboring block of the current block in the same view by using the video information, inducing a second disparity vector by using the first disparity vector and a reference view depth, and inducing a third disparity vector using a difference between the first disparity vector and the second disparity vector; inducing a prediction sample of the current block by using one of the first disparity vector, the second disparity vector, and the third disparity vector; and applying filtering to a current picture which has been reconstructed using the prediction sample.

According to the present invention, the disparity vector can be efficiently induced using information and a depth of a neighboring block.

According to the present invention, a storage unit of the disparity vector can be newly regulated and complexity of a coding process can be reduced and a coding efficiency can be increased.

According to the present invention, a coding efficiency of a multi-view video can be increased by efficiently predicting a motion vector using the disparity vector.

BRIEF DESCRIPTION OF THE DRAWINGS

FIG. 15 is a diagram schematically illustrating another example of configuring a MVP list according to the present invention.

DESCRIPTION OF EXEMPLARY EMBODIMENTS

As used herein, a term "Pixel" or "pel" means a minimum unit constituting a single image. A term "Sample" may be used as a term representing a value of a specific pixel. In this connection, the sample may indicate a pixel value of a luma component and/or a pixel value of a chroma component.

As used herein, a term "Unit" means a basic unit for image processing and/or a specific position in an image. The unit may be used interchangeably with terms such as "block", "area", or the like. Generally, a M×N block refers to a set of samples or transform coefficients arranged in M columns and N rows.

Hereinafter, embodiments of the present invention will be described in details with reference to the attached drawings.

Figure 1:
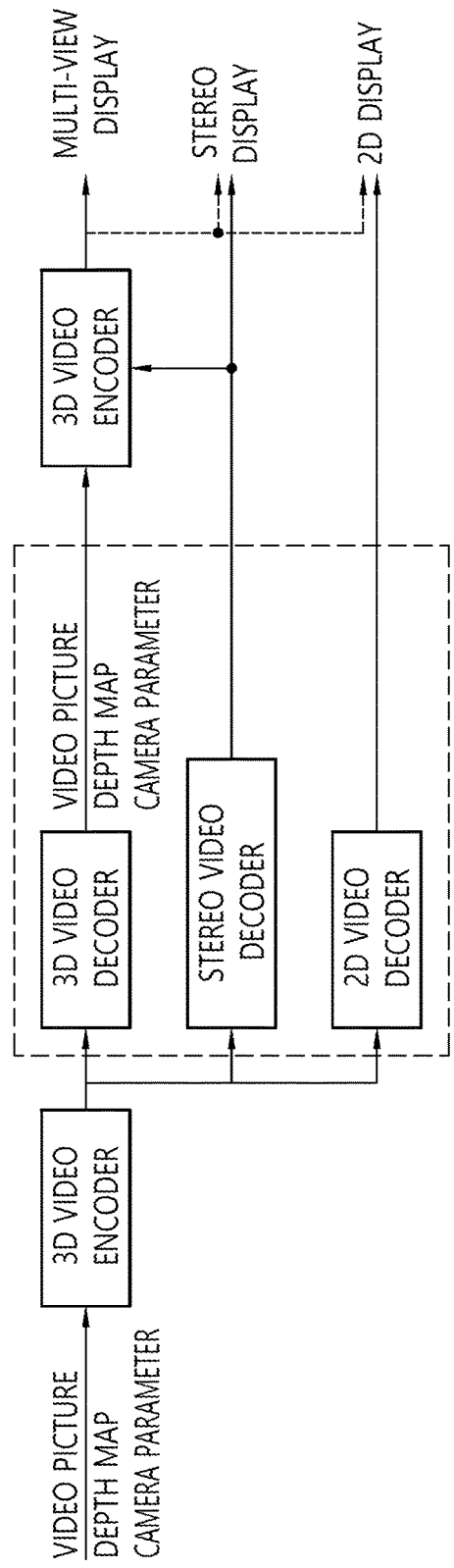
FIG. 1 is a block diagram schematically illustrating an encoding and decoding process of a 3D video.

FIG. 1 is a diagram scheduling describing encoding and decoding processes of a 3D video.

Referring to FIG. 1, a 3D video encoder encodes a video picture and a depth map and a camera parameter to output the same as a bitstream.

The depth map may be constituted by distance information (depth information) between a camera and a subject with respect to a pixel of the corresponding video picture (texture picture). For example, the depth map may be a picture acquired by normalizing the depth information according to a bit depth. In this case, the depth map may be constituted by the depth information recorded without expression of a chrominance.

In general, since a distance from the subject and a disparity are in inverse proportion to each other, disparity information indicating a correlation between views may be induced from the depth information of the depth map by using the camera parameter.

A bitstream including the depth map and camera information together with a general color picture, that is, the video picture (texture picture) may be transmitted to a decoder through a network or a storage medium.

The decoder receives the bitstream to reconstruct the video. When a 3D video decoder is used as the decoder, the 3D video decoder may decode the video picture, and the depth map and the camera parameter from the bitstream. Views required for a multi-view display may be synthesized based on the decoded video picture, depth map, and camera parameter. In this case, when the used display is a stereo display, the 3D picture may be displayed by using two pictures among the reconstructed multi-views.

When the stereo video decoder is used, the stereo video decoder may reconstruct two pictures to be incident in both eyes from the bitstream. The stereo display may display a 3D picture by using a view difference or disparity between a left picture incident in a left eye and a right picture incident in a right eye. When the multi-view display is used together with the stereo video decoder, the multi-views may be displayed by generating other views based on the two reconstructed pictures.

When a 2D decoder is used, a 2D picture is reconstructed to output the picture through a 2D display. The 2D display is used, but when the 3D video decoder or the stereo video decoder is used as the decoder, one of the reconstructed pictures may be output through the 2D display.

In the configuration of FIG. 1, the view synthesis may be performed by the decoder or the display. Further, the decoder and the display may be one apparatus or separate apparatuses.

In FIG. 1, for easy description, it is described that the 3D video decoder, the stereo video decoder, and the 2D video decoder are separate decoders, but one decoding apparatus may perform all 3D video decoding, stereo video decoding, and 2D video decoding. Further, a 3D video decoding apparatus may perform the 3D video decoding, a stereo video decoding apparatus may perform the stereo video decoding, and a 2D video decoding apparatus may perform the 2D video decoding. Furthermore, the multi-view display may output a 2D video or a stereo video.

Figure 2:
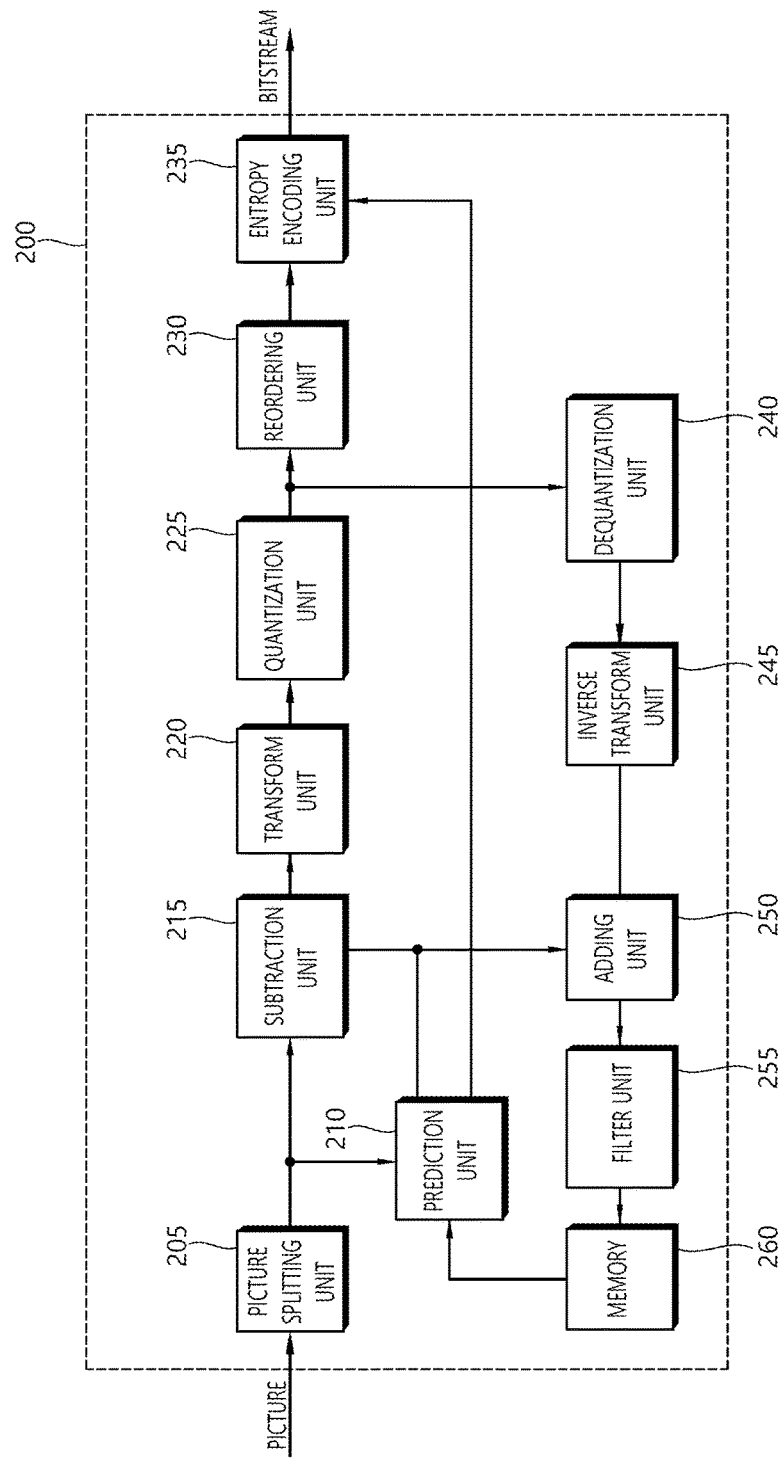
FIG. 2 is a block diagram schematically illustrating a configuration of a video encoding device.

FIG. 2 is a diagram schematically describing a configuration of a video encoding apparatus. Referring to FIG. 2, the video encoding apparatus 200 includes a picture splitting unit 205, a prediction unit 210, a subtraction unit 215, a transform unit 220, a quantization unit 225, a reordering unit 230, an entropy encoding unit 235, an dequantization unit 240, an inverse transform unit 245, an adding unit 250, a filter unit 255, and a memory 260.

The picture splitting unit 05 may split an input picture into at least one processing unit block. In this case, the processing unit block may be a coding unit block, a prediction unit block, or a transform unit block. The coding unit block as a unit block of coding may be split from a maximum coding unit block according to a quad tree structure. The prediction unit block as a block partitioned from the coding unit block may be a unit block of sample prediction. In this case, the prediction unit block may be divided into sub blocks. The transform unit bock as the coding unit block may be split according to the quad tree structure and may be a unit block to induce a transform coefficient or a unit block to induce a residual signal from the transform coefficient.

As used herein, for the sake of convenience of illustration, a coding unit block is referred to as a coding block or a coding unit (CU). A prediction unit block is referred to as a prediction block or a prediction unit (PU). A transform unit block is referred to as a transform block or a transform unit (TU).

The prediction block or the prediction unit may mean a block-shape specific area or an array of the prediction sample. Further, the transformation block or the transform unit may mean the block-shape specific area or an array of the transform coefficient or a residual sample.

The prediction unit 210 may perform a prediction for a processing target block (hereinafter, referred to as a current block) and generate the prediction block including prediction samples for the current block. A unit of the prediction performed by the prediction unit 210 may be the coding block, the transformation block, or the prediction block.

The prediction unit 210 may decide whether an intra prediction is applied to the current block or whether an inter prediction is applied to the current block.

In the case of the intra prediction, the prediction unit 210 may induce the prediction sample for the current block based on a neighbor block pixel in a picture (hereinafter, a current picture) to which the current block belongs. In this case, the prediction unit 210 may (i) induce the prediction sample based an average or an interpolation of neighbor reference samples of the current block or (ii) induce the prediction sample based on a reference sample which is present in a specific direction with respect to a prediction target pixel among neighbor blocks of the current block. For easy description, the case of (i) is referred to as a non-directional mode and the case of (ii) is referred to as a directional mode. The prediction unit 210 may decide a prediction mode applied to the current block by using the prediction mode applied to the neighbor block.

In the case of the inter prediction, the prediction unit 210 may induce the prediction sample for the current block based on samples specified by a motion vector on a collocated picture. The prediction unit 10 applies any one of a skip mode, a merge mode, and an MVP mode to induce the prediction sample for the current block. In the cases of the skip mode and the merge mode, the prediction unit 210 may use motion information of the neighbor block as the motion information of the current block. In the case of the skip mode, a difference (residual) between the prediction sample and an original sample is not transmitted unlike the merge mode. In the case of the MVP mode, the motion vector of the neighbor block is used as a motion vector predictor (MVP) to induce the motion vector of the current block.

In the case of the inter prediction, the neighbor block includes a spatial neighbor block which is present in the current picture and a spatial neighbor block which is present in the collocated picture. The motion information includes the motion vector and the collocated picture. In the skip mode and the merge mode, when the motion information of the spatial neighbor block is used, a highest picture on a collocated picture list may be used as the collocated picture.

In the case of encoding a dependent view, the prediction unit 210 may perform an inter-view prediction.

The prediction unit 210 may configure the collocated picture list including a picture of another view. For the inter-view prediction, the prediction unit 210 may induce a disparity vector. Unlike a motion vector specifying a block corresponding to the current block in another picture in a current view, the disparity vector may specify a block corresponding to the current block in another view of the same access unit as the current picture.

The prediction unit 210 may specify a depth block in a depth view based on the disparity vector and perform a configuration of a merge list, an inter-view motion prediction, an illumination compensation (IC), view synthesis, and the like.

The disparity vector for the current block may be induced from a depth value by using the camera parameter or induced from the motion vector or disparity vector of the neighbor block in the current or another view.

For example, the prediction unit 210 may add to a merge candidate list an inter-view merging candidate (IvMC) corresponding to spatial motion information of a reference view, an inter-view disparity vector candidate (IvDC) corresponding to the disparity vector, a shifted IvMC induced by a shift of the disparity, a texture merging candidate (T) induced from a texture corresponding to a case in which the current block is a block on the depth map, a disparity derived merging candidate (D) derived from the texture merging candidate by using the disparity, a view synthesis prediction merge candidate (VSP) derived based on the view synthesis, and the like.

In this case, the number of candidates included in a merge candidate list applied to the dependent view may be limited to a predetermined value.

Further, the prediction unit 210 may predict the motion vector of the current block based on the disparity vector by applying the inter-view motion vector prediction. In this case, the prediction unit 210 may derive the disparity vector based on conversion of a maximum depth value in the corresponding depth block. When a position of the reference sample in the reference view is specified by adding the disparity vector to a sample position of the current block in the reference view, a block including the reference sample may be used as the reference block. The prediction unit 210 may use the motion vector of the reference block as a candidate motion parameter or a motion vector predictor candidate of the current block and use the disparity vector as a candidate disparity vector for a disparity compensated prediction (DCP).

The subtraction unit 215 generates the residual sample which is the difference between the original sample and the prediction sample. When the skip mode is applied, the subtraction unit 215 may not generate the residual sample as described above.

The transform unit 210 generates the transform coefficient by using transforming the residual sample by the unit of the transform block. The quantization unit 225 quantizes the transform coefficients to generate quantized transform coefficients.

The reordering unit 230 reorders the quantized transform coefficients. The reordering unit 230 may reorder the block-shape quantized transform coefficients in a 1D vector shape through a scanning method.

The entropy encoding unit 235 may perform entropy-encoding of the quantized transform coefficients. As the entropy encoding, encoding methods including, for example, exponential Golomb, context-adaptive variable length coding (CAVLC), context-adaptive binary arithmetic coding (CABAC), and the like may be used. The entropy encoding unit 235 may encode information (e.g., a value of a syntax element, and the like) required for video reconstruction together or separately in addition to the quantized transform coefficients.

The entropy-encoded information may be transmitted or stored by the unit of a network abstraction layer as the form of the bitstream.

The dequantization unit 240 dequantizes the quantized transform coefficient to generate the transform coefficient. The inverse transform unit 245 inversely transforms the transform coefficient to generate the residual sample.

The adding unit 250 adds the residual sample and the prediction sample to reconstruct the picture. The residual sample and the prediction sample are added to each other by the unit of the block to generate a reconstruction block. Herein, the adding unit 250 is described as a separate component, but the adding unit 250 may be a part of the prediction unit 210.

The filter unit 255 may apply a deblocking filter and/or offset to the reconstructed picture. Distortion during an artifact or a quantization process of a block boundary in the reconstructed picture may be corrected through the deblocking filtering and/or offset. The offset may be applied by the unit of the sample and applied after the process of the deblocking filtering is completed.

The memory 260 may store the reconstructed picture or information required for encoding/decoding. For example, the memory 60 may store pictures used for the inter prediction/inter-view prediction. In this case, the pictures used for the inter prediction/inter-view prediction may be designated by a collocated picture set or a collocated picture list.

Herein, it is described that one encoding apparatus encodes an independent view or the dependent view, but this is for easy description and a separate encoding apparatus is configured for each view or a separate internal module (for example, a prediction unit for each view) may be configured for each view.

Figure 3:
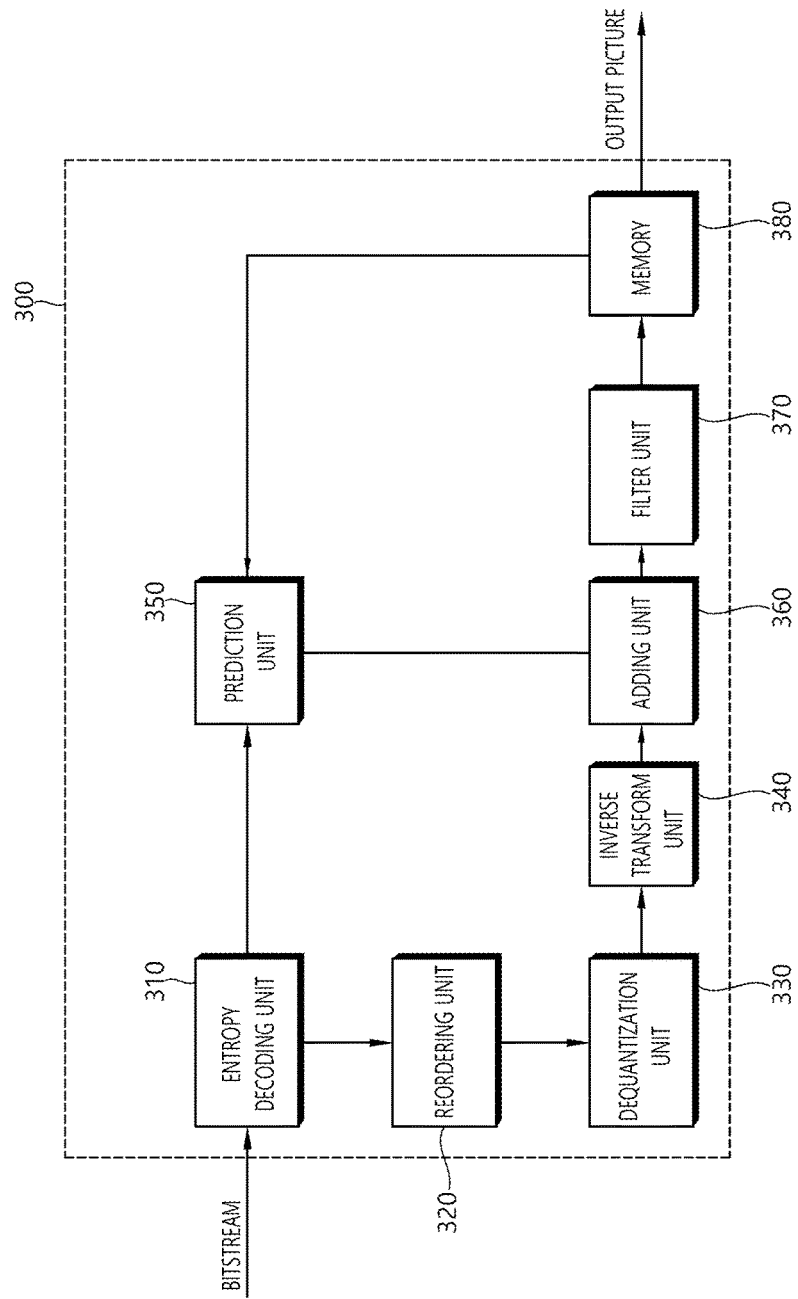
FIG. 3 is a block diagram schematically illustrating a configuration of a video decoding device.

FIG. 3 is a diagram schematically describing a configuration of a video decoding apparatus. Referring to FIG. 3, the video decoding apparatus 300 includes an entropy decoding unit 310, a reordering unit 320, a dequantization unit 330, an inverse transform unit 340, a prediction unit 350, an adding unit 360, a filter unit 370, and a memory 380.

When a bitstream including video information is input, the video decoding apparatus 300 may reconstruct a video to correspond to a process in which the video information is processed by the video encoding apparatus.

For example, the video decoding apparatus 300 may perform video decoding by using the processing unit applied in the video encoding apparatus. In this case, the processing unit block of the video decoding may be the coding unit block, the prediction unit block, or the transform unit block. The coding unit block as a unit block of decoding may be split from the maximum coding unit block according to the quad tree structure. The prediction unit block as the block partitioned from the coding unit block may be the unit block of sample prediction. In this case, the prediction unit block may be divided into sub blocks. The transform unit bock as the coding unit block may be split according to the quad tree structure and may be a unit block to derive a transform coefficient or a unit block to derive a residual signal from the transform coefficient.

The entropy decoding module 310 may parse a bitstream and output information required to recover a video or picture. For example, the entropy decoding module 310 may decode information in the bitstream based on an expotential-Golomb, CAVLC, CABAC, etc., and output a syntax element value for video recovery, a quantized value of a transform coefficient for a residual.

When a plurality of views is processed in order to reproduce the 3D video, the bitstream may be input for each view. Alternatively, information on the respective views may be multiplexed in the bitstream. In this case, the entropy decoding unit 310 de-multiplexes the bitstream to parse the de-multiplexed bitstream for each view.

The reordering unit 320 may reorder the quantized transform coefficients in the 2D block form. The reordering unit 320 may perform reordering to correspond to coefficient scanning performed by the encoding apparatus.

The dequantization unit 330 dequantizes the quantized transform coefficients based on (de)quantized parameters to output the transform coefficients. Information for deriving the quantized parameters may be signaled from the encoding apparatus.

The inverse transform unit 340 inversely transforms the transform coefficients to derive the residual samples.

The prediction unit 350 may perform a prediction for the current block and generate the prediction block including prediction samples for the current block. A unit of the prediction performed by the prediction unit 350 may be the coding block, the transformation block, or the prediction block.

The prediction unit 350 may decide whether the intra prediction is applied to the current block or whether the inter prediction is applied to the current block. In this case, a unit for deciding which the intra prediction or the inter prediction is applied and a unit for generating the prediction sample may be different from each other. Moreover, the units for generating the prediction sample in the inter prediction and the intra prediction may also be different from each other.

In the case of the intra prediction, the prediction unit 350 may derive the prediction sample for the current block based on the neighbor block pixel in the current picture. The prediction unit 350 may derive the prediction sample for the current block by applying the directional mode or the non-directional mode based on neighbor reference blocks of the current block. In this case, the prediction mode to be applied to the current block may be decided by using an intra prediction mode of the neighbor block.

In the case of the inter prediction, the prediction unit 350 may derive the prediction sample for the current block based on the samples specified by the motion vector on the collocated picture. The prediction unit 10 applies any one of the skip mode, the merge mode, and the MVP mode to derive the prediction sample for the current block.

In the cases of the skip mode and the merge mode, the prediction unit 350 may use the motion information of the neighbor block as the motion information of the current block. In this case, the neighbor block may include a spatial neighbor block and a temporal neighbor block.

The prediction unit 350 may configure the merge candidate list as motion information of an available neighbor block and information indicated by a merge index on the merge candidate list may be used as the motion vector of the current block. The merge index may be signaled from the encoding apparatus. The motion information includes the motion vector and the collocated picture. In the skip mode and the merge mode, when the motion information of the temporal neighbor block is used, the highest picture on the collocated picture list may be used as the collocated picture.

In the case of the skip mode, the difference (residual) between the prediction sample and the original sample is not transmitted unlike the merge mode.

In the case of the MVP mode, the motion vector of the neighbor block is used as the motion vector predictor (MVP) to derive the motion vector of the current block. In this case, the neighbor block may include the spatial neighbor block and the temporal neighbor block.

In the case of encoding the dependent view, the prediction unit 350 may perform the inter-view prediction. In this case, the prediction unit 350 may configure the collocated picture list including the picture of another view.

For the inter-view prediction, the prediction unit 350 may derive the disparity vector. The prediction unit 350 may specify the depth block in the depth view based on the disparity vector and perform the configuration of the merge list, the inter-view motion prediction, the illumination compensation (IC), the view synthesis, and the like.

The disparity vector for the current block may be derived from the depth value by using the camera parameter or derived from the motion vector or disparity vector of the neighbor block in the current or another view. The camera parameter may be signaled from the encoding apparatus.

When the merge mode is applied to the current block of the dependent view, the prediction unit 350 may add to the merge candidate list IvDC corresponding to the temporal motion information of the reference view, IvDC corresponding to the disparity vector, shift IvMC derived by the shift of the disparity vector, the texture merge candidate (T), derived from the texture corresponding to the case in which the current block is the block on the depth map, the disparity derive merge candidate (D) derived from the texture merge candidate by using the disparity, the view synthesis prediction merge candidate (VSP) derived based on the view synthesis, and the like.

In this case, the number of candidates included in the merge candidate list applied to the dependent view may be limited to a predetermined value.

Further, the prediction unit 350 may predict the motion vector of the current block based on the disparity vector by applying the inter-view motion vector prediction. In this case, the prediction unit 350 may use the block in the reference view specified by the disparity vector as the reference block. The prediction unit 350 may use the motion vector of the reference block as the candidate motion parameter or the motion vector predictor candidate of the current block and use the disparity vector as the candidate disparity vector for the DCP.

The adding unit 360 adds the residual sample and the prediction sample to reconstruct the current block or the current picture. The adding unit 360 adds the residual sample and the prediction sample by the unit of the block to reconstruct the current picture. When the skip mode is applied, since the residual is not transmitted, the prediction sample may become a reconstruction sample. Herein, the adding unit 360 is described as a separate component, but the adding unit 360 may be a part of the prediction unit 350.

The filter unit 370 may apply the deblocking filtering and/or offset to the reconstructed picture. In this case, the offset may be adaptively applied as the offset of the sample unit.

The memory 380 may store the reconstructed picture or information required for decoding. For example, the memory 380 may store pictures used for the inter prediction/inter-view prediction. In this case, the pictures used for the inter prediction/inter-view prediction may be designated by the collocated picture set or the collocated picture list. The reconstructed picture may be used as the collocated picture.

Further, the memory 380 may output the reconstructed pictures according to an output order. In order to reproduce the 3D picture, although not illustrated, an output unit may display a plurality of different views.

In the example of FIG. 3, it is described that one decoding apparatus decodes the independent view and the dependent view, but this is for easy description and the present invention is not limited thereto. For example, each decoding apparatus may operate for each view and one decoding apparatus may include an operating unit (for example, a prediction unit) corresponding to each view therein.

When coding a multi-view video, encoding and decoding devices may improve efficiency of video coding for a current view, using coded data for different view belonging to the same access unit (AU) as a current picture. In this connection, pictures having an equal POC (Picture Order Count) may define a single AU. The POC refers to a display order of a certain picture.

The encoding and decoding devices may code views on an AU unit basis, and/or may code pictures on a view unit basis. The coding may proceed for the views based on a predetermined order. A view to be coded first may be referred to as a base view or independent view. A view to be coded with reference to different view after coding the independent view may be referred to as a dependent view.

Further, when a current view is a dependent view, different view to be referenced for coding (encoding/decoding) of the current view may be referred to as a reference view.

Figure 4:
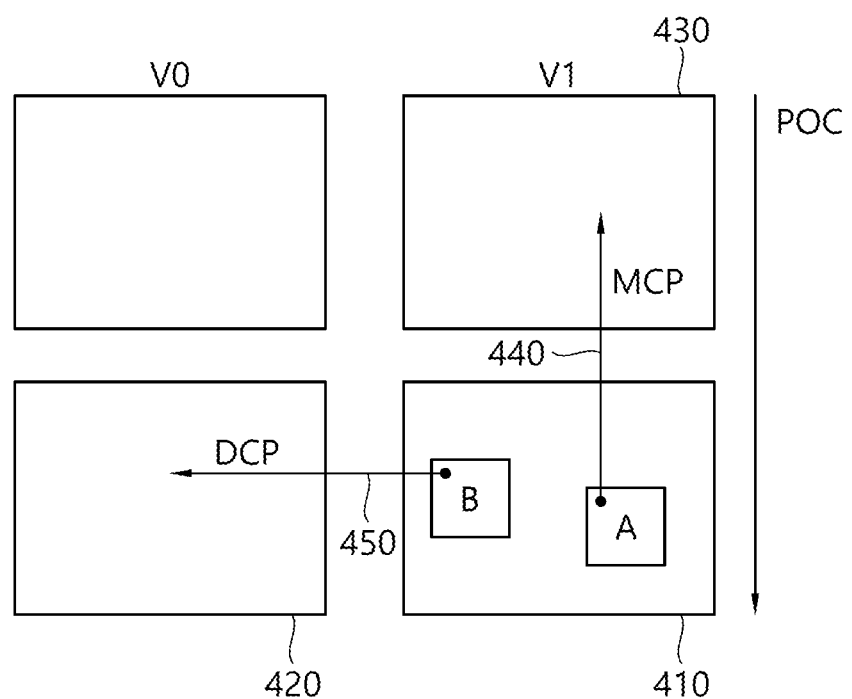
FIG. 4 is a diagram schematically illustrating an inter-view coding.

FIG. 4 schematically illustrates an inter-view coding method. In an example of FIG. 4, coding is performed on an AU unit basis, and V0 is an independent view, and V1 is a dependent view. Inter picture prediction may be carried out, for example, for a block A in a current picture 410 with reference to another picture 430 in the same view as the current picture 410 by using a motion vector 440. Such inter picture prediction may be referred to as motion-compensated prediction (MCP). In an alternative, inter picture prediction may be carried out, for example, for a block B in the current picture 410 with reference to a picture 420 in a different view from the current picture 410 but existing in the same access unit, that is, having the same POC as the current picture 410 by using a disparity vector 450. Such inter picture prediction may be referred to as disparity-compensated prediction (DCP).

When coding a multi-view video, the inter picture prediction may employ a depth map besides the picture in the different view from the current view containing the current block.

Figure 5:
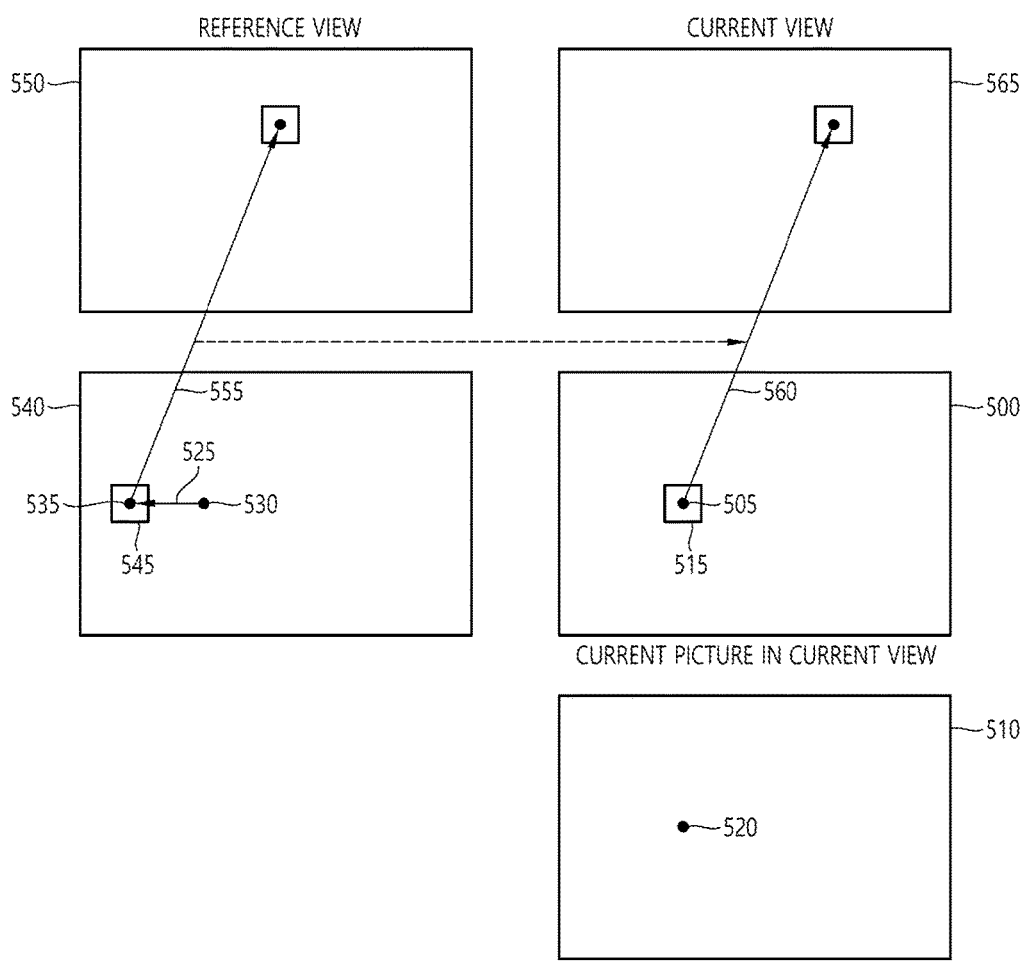
FIG. 5 schematically illustrates a multi-view coding method using a depth map.

FIG. 5 schematically illustrates a multi-view coding method using a depth.

Referring to FIG. 5, a block (current block 505) in a current picture 500 in a current view may be coded (encoded/decoded) using a depth map 510. In this connection, a depth value d for a position (x, y) of a sample 520 in the depth map 510 corresponding to a position (x, y) of a sample 515 in the current block 505 may be transformed to a disparity vector 525. The depth value d may be derived based on a distance between the sample pixel and a camera.

Encoding and decoding devices may add a disparity vector 525 to the position (x, y) of the sample 530, thereby to determine a position of a reference sample 535 in a current picture 540 in a reference view. The disparity vector may have only a x axial component. Therefore, the disparity vector value may be a value (disp, 0). Thus, the position (xr, y) of the reference sample 540 may be determined to be a position (x+disp, y).

Encoding and decoding devices may employ a motion parameter for the reference block 545 including a reference pixel 535 as a candidate motion parameter for the current block. For example, when a reference picture 550 in the reference view is a reference picture for the reference block 545, the motion vector 555 for the reference block 545 may be derived from a motion vector 560 for the current block 505. In this connection, a picture 565 may be a reference picture in the current view.

Meanwhile, as described above, a video decoding of a multi-view may refer to information of a different view using a disparity vector.

In order to code (encode/decode) a picture of a dependent view, if there is a DCP coded block among previously coded neighboring blocks, a disparity vector of a DCP coding block may be used as a disparity vector to be applied to a current block. In this case, the disparity vector induced from the neighboring blocks, that is, a disparity vector of a DCP coded block may be used as a disparity vector for applying an inter-view motion prediction (IVMP) and an inter-view residual prediction (IVRP) to the current block.

A case where a motion vector of a current block is determined according to an IVMP is firstly described. In a motion vector prediction (MVP) mode, an advanced motion vector prediction (AMVP) mode, a merge mode, or a SKIP mode, when a candidate vector induced from a motion vector of a corresponding block in the inter-view reference picture is selected as a motion vector applied to a current block, a current block is coded to an MCP.

A block having a motion vector predicted by an IVMP method among blocks coded to the MCP refers to a DV-MCP block.

Figure 6:
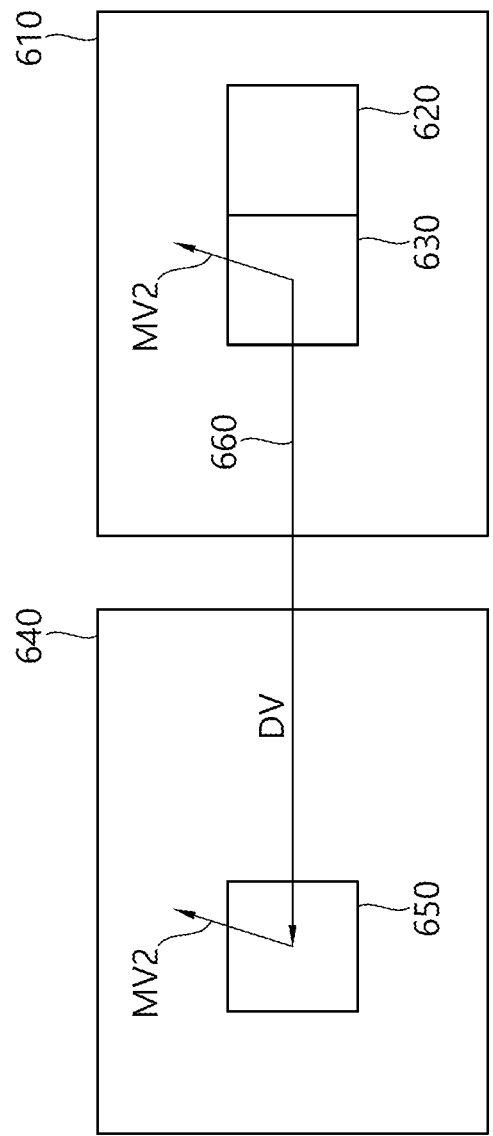
FIG. 6 is a diagram schematically illustrating a DV-MCP block.

FIG. 6 is a diagram schematically illustrating a DV-MCP block. FIG. 6 illustrates a case of inter-predicting a current block 620 in a current picture 610 of a current view.

Referring to FIG. 6, a motion vector MV1 of a neighboring block 630 used in inter-prediction of the current block 620 is induced from a corresponding block 650 of a reference picture 640 in a base view. In this case, the corresponding block is specified by a disparity vector DV 660. The response block is a candidate block used in inter-prediction of the current block 630, and may be configured as a motion vector MV2 of the corresponding block 650 or may be induced from the motion vector MV2 of the corresponding block 650.

In this case, a POC of the reference picture 640 in the base view may be the same as a POC of the current picture 610. A neighboring block 630 to which a motion vector MV1 predicted from a motion vector MV2 of a corresponding block 650 in a different view may refer to a DV-MCP block.

An encoding device and a decoding device may store information of a disparity vector used in motion vector prediction of the DV-MCP block to use the stored information of the disparity vector for a disparity vector inducing procedure of a neighboring block.

Figure 7:
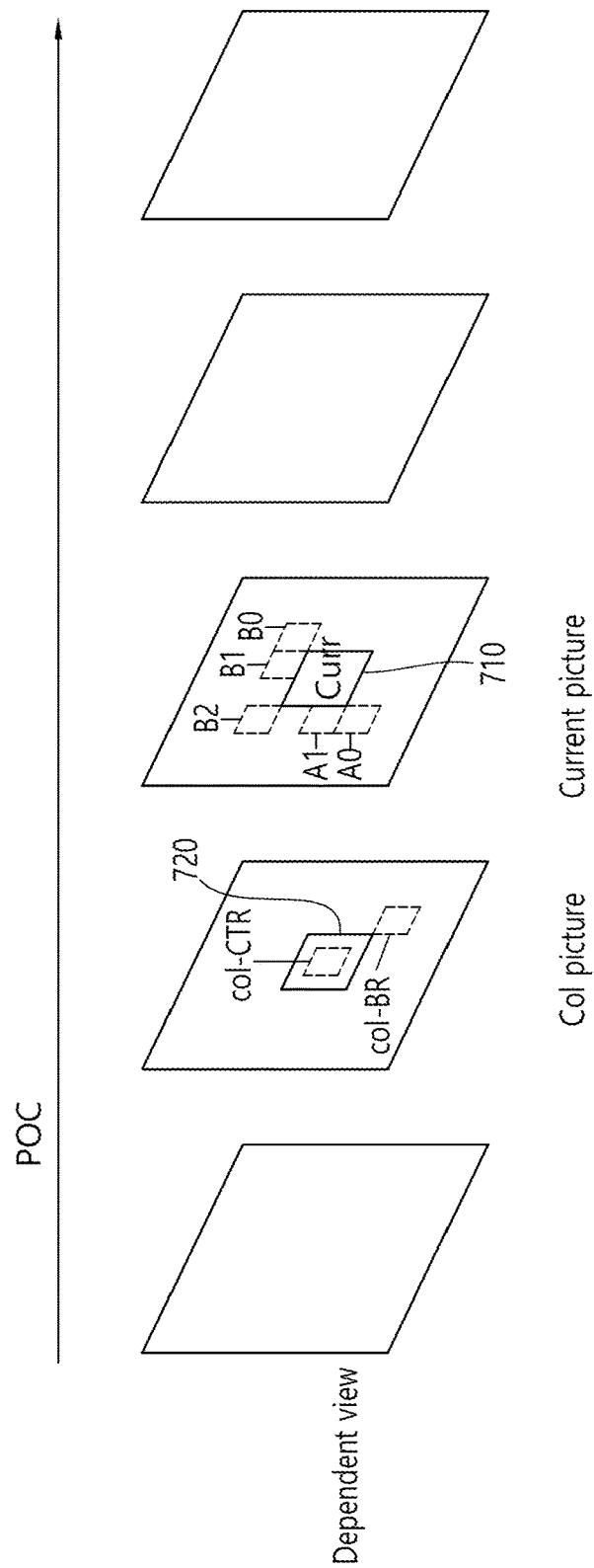
FIG. 7 is a diagram schematically illustrating an example of neighboring blocks of a current block.

FIG. 7 is a diagram schematically illustrating an example of neighboring blocks of a current block. Neighboring blocks are blocks in which decoding is terminated upon decoding the current block and access is possible.

The neighboring blocks of the current block 710 includes spatial neighboring blocks A0, A1, B0, B1, and B2 and temporal neighboring blocks col-CTR (col-center), col-RB (col-right bottom). Respective locations of the spatial neighboring blocks are specified based on a location of the current block 710.

Further, respective locations of the temporal neighboring blocks are specified based on a location 720 corresponding to a current block in a collocated picture. In a case of the temporal neighboring block, a coding block including a pixel located at a center of a current block 720 in a current picture or a collocated picture designated upon decoding a current slice becomes the col-CTR. Moreover, when a right bottom end position of a current block 720 in the collocated picture is (x,y), a coding block including a pixel of a (x+1, y+1) position becomes a col-RB. Hereinafter, for the purpose of convenience of description, the col-CTR is expressed as a CTR, and the col-BR is expressed as a BR.

The collocated picture may be one selected from temporal reference pictures included in a reference picture list of a current picture or a current slice for temporal disparity vector derivation.

The collocated picture may be reported to a decoder through a slice header. For example, information indicating which picture is used as the collocated picture may be signaled in the slice header.

Hereinafter, examples of a method of inducing a disparity vector from neighboring blocks when the neighboring blocks are defined like an example of FIG. 7 will be described. For the purpose of convenience of description, in a following description, the induction of the disparity vector is performed by an encoding device and a decoding device.

<Method 1 of Inducing a Disparity Vector of a Current Block from a Neighboring Block>

(1-1) the encoding device and/or the decoding device search spatial neighboring blocks in a predetermined order. When the searched block is a DCP block, the encoding device and/or the decoding device return a disparity vector for a DCP and terminate a disparity vector inducing process.

In this case, it may be known whether the neighboring block is the DCP block. It is assumed that a prediction mode of the neighboring block is an inter-prediction or skip mode, and a POC and a view ID of a L0 reference picture or a L1 reference picture are neighbor_ref_pocX, and neighbor_ref_vidX (X is 0 or 1), respectively. In this case, when a POC (neighbor_ref_pocX) of the neighboring block is a POC of the current block and a view ID (neighbor_ref_vidX) of the neighboring block differs from a view ID of the current picture, a corresponding neighboring block may be determined as a DCP block.

(1-2) When the DCP block is not searched from the neighboring blocks, the encoding device and/or the decoding device search the temporal neighboring blocks and the spatial neighboring blocks in a predetermined order to confirm whether the temporal neighboring blocks and the spatial neighboring blocks are a DV-MCP block. When the searched neighboring block is the DV-MCP block, the encoding device and/or the decoding device return a disparity vector stored in the DV-MCP block and terminate the disparity vector inducing process.

(1-3) an order of searching the neighboring blocks in the above (1-1) and (1-2) may be variously configured. For example, the neighboring blocks may be searched in the order of A1, B1, A0, B0, B2, col-CTR, and col-RB, and may be searched in the order of A0, A1, B0, B1, B2, col-CTR, and col-RB.

In addition, the encoding device and/or the decoding device may not search all neighboring blocks but may use only predetermined neighboring blocks. For example, the encoding device and/or the decoding device may use only an upper block B1 and a left block A1 of a current block among neighboring blocks of FIG. 7 as the spatial neighboring block. In addition, the encoding device and/or the decoding device may use only a block col-CTR located at a center of a region 720 corresponding to a current block in the collocated picture among the neighboring blocks of FIG. 7 as the temporal neighboring block.

In this case, the encoding device and/or the decoding device may search neighboring blocks in a predetermined order to induce a disparity vector. For example, the encoding device and/or the decoding device may firstly search temporal neighboring blocks and then search spatial neighboring blocks. Further, with the spatial neighboring blocks, left blocks may be firstly searched and then upper blocks may be searched. In addition, the encoding device and/or the decoding device may previously set a predetermined search order to induce the disparity vector.

<Method 2 of Inducing a Disparity Vector of a Current Block from Neighboring Blocks>

(2-1) the encoding device and/or the decoding device search a DCP block from neighboring blocks. When one or more DCP blocks are searched, the encoding device and/or the decoding device return a disparity vector having the greatest absolute value of a horizontal component among disparity vectors of each DCP block and terminate the disparity vector inducing process. For example, it is assumed that DCP blocks searched from the neighboring blocks and disparity vectors of the respective DCP blocks have a relation as illustrated in a following table 1.

TABLE 1

| | Neighboring block | | | | | | |
|---|---|---|---|---|---|---|---|
| | A1 | B1 | A0 | B0 | B2 | Col-CTR | Col-RB |
| DCP block? | O | X | O | X | X | O | X |
| Disparity vector | (10, 2) | — | (5, 3) | (13, 0) | — | (7, 2) | — |

In the table 1, when a second row of each column is initialized to X (false) and a corresponding neighboring block is a DCP block, a 0 (true) is stored and a motion vector of a motion vector is recorded in a third row.

In a search procedure of the temporal neighboring block, if information is obtained from a firstly searched block during search in a preset order, a next block is not searched. In an example of the table 1, since a col-CTR block of two temporal neighboring blocks col-CTR and col-RB is a DCP block and information of the disparity vector is obtained from the col-CTR block, additional search, that is, search for the col-CTR block is not performed.

As illustrated in the table 1, when a plurality of disparity vectors are searched, a disparity vector of a B0 block having the greatest absolute value of a horizontal component is set as a disparity vector of a current block and an inducing process of the disparity vector is terminated.

(2-2) when the DCP block is not searched from the neighboring block, the encoding device and/or the decoding device may search a DV-MCP block. When one or more DV-MCP blocks are searched, the encoding device and/or the decoding device return a disparity vector having the greatest absolute value of a horizontal component among disparity vectors stored in each DV-MCP, and terminate the inducing process of the disparity vector. A table 2 illustrates an example of collecting DV-MCP block information from neighboring blocks. In a case of the table 2, the greatest absolute value of the horizontal component of the disparity vector is 10 of B2. Accordingly, the encoding device and/or the decoding device may induce a disparity vector of a B2 block as a disparity vector of a current block to terminate a disparity vector inducing procedure.

TABLE 2

| | Neighboring block | | | | | | |
|---|---|---|---|---|---|---|---|
| | A1 | B1 | A0 | B0 | B2 | Col-CTR | Col-RB |
| DV-MCP? | X | O | X | X | O | X | X |
| Disparity vector | — | (5, 2) | — | — | (10, 0) | — | — |

<Method 3 of Inducing a Disparity Vector of a Current Block from Neighboring Blocks>

The disparity vector of a current block may be induced from neighboring blocks by combining the above method 1 with the above method 2.

(3-1) the encoding device and/or the decoding device search DCP blocks from only spatial neighboring blocks. When a plurality of DCP blocks are searched, the encoding device and/or the decoding device return a disparity vector having the greatest absolute value of a horizontal component among disparity vectors of each DCP block and terminates the disparity vector inducing process.

(3-2) the encoding device and/or the decoding device search the temporal neighboring block in a preset order to search a DCP block. When the DCP block is searched, the encoding device and/or the decoding device return a disparity vector for the DCP and terminate the disparity vector inducing process.

(3-3) the encoding device and/or the decoding device search DC-MCP blocks from spatial neighboring blocks. When a plurality of DV-MCP blocks are searched, the encoding device and/or the decoding device return a disparity vector having the greatest absolute value of a horizontal component among the disparity vectors stored in each DV-MCP block and terminate the disparity vector inducing process.

(3-4) the encoding device and/or the decoding device search the temporal neighboring blocks in a preset order to search a DV-MCP block. When the DV-MCP block is searched, the encoding device and/or the decoding device return a disparity vector stored in the DV-MCP block and terminate the disparity vector inducing process.

<Method 4 of Inducing a Disparity Vector of a Current Block from Neighboring Blocks>

The disparity vector of a current block may be induced from neighboring blocks by combining the above method 1 with the above method 2.

(4-1) the encoding device and/or the decoding device firstly search DCP blocks from temporal neighboring blocks. When a plurality of DCP blocks are searched, the encoding device and/or the decoding device may set a disparity vector having the greatest absolute value of the horizontal component among disparity vectors of the DCP block, as a disparity block of the current block and terminate the disparity vector inducing process.

(4-2) the encoding device and/or the decoding device search the spatial neighboring blocks in a preset order to search a DCP block. When the DCP block is searched, the encoding device and/or the decoding device output a disparity vector of the searched DCP block as a disparity vector of the current and terminate the disparity vector inducing process.

(4-3) the encoding device and/or the decoding device search DV-MCP blocks from spatial neighboring blocks. When a plurality of DV-MCP blocks are searched, the encoding device and/or the decoding device return a disparity vector having the greatest absolute value of a horizontal component among disparity vectors stored in each DV-MCP block and terminates the disparity vector inducing process.

Meanwhile, in the second to fourth methods of inducing the disparity vector, the encoding device and/or the decoding device do not search all neighboring blocks but may use only predetermined neighboring blocks. For example, only an upper block B1 and a left block A1 of a current block among the neighboring blocks of FIG. 7 may be used as a spatial neighboring block. In addition, only a block col-CTR located at a center of a region 720 corresponding to a current block in a collocated picture among the neighboring blocks of FIG. 7 may be used as a temporal neighboring block.

As described above, the inducing of the disparity vector from the neighboring block may simply refer to disparity vector from neighboring blocks (NBDV). In this manner, the encoding device and/or the decoding device may apply higher priority to information of the DCP block as compared with information of the DV-MCP block.

A disparity vector induced through the disparity vector inducing procedure is a disparity vector selected according to a certain reference from neighboring blocks with respect to a current CU block.

This projects a location of a block having the smallest pixel difference from a block of an inter-view reference picture in the neighboring block, which may be a difference from a disparity to be really obtained, that is, an ideal disparity. Further, since the above is performed on the assumption that the neighboring block is similar to the current block, if similarity of a block inducing a disparity to the current block (e.g., current coding block) is reduced, the precision of the disparity may be reduced. In addition, if the disparity vector is not obtained although the neighboring blocks are searched, the encoding device and/or the decoding device may use a zero disparity.

As described above, since a method of inducing the disparity from the neighboring blocks uses the disparity vector induced from the neighboring blocks as a disparity with respect to the current block, a disparity used in a prediction procedure may be different from a real disparity. In order to compensate for the above point, a standardizing procedure of a current view may correct a disparity using a decoded depth map of a neighboring view.

When coding (encoding/decoding) a texture of a dependent view, a depth map of a referring view (e.g., base view) is accessible. If a pixel value of the depth map and a camera parameter are input upon encoding, the disparity may be calculated through the input values. Accordingly, in a procedure of inducing a disparity (disparity vector) to code the texture of the dependent view, if a depth map of a referring view is used, a disparity of a current block induced from the neighboring blocks may be corrected.

Figure 8:
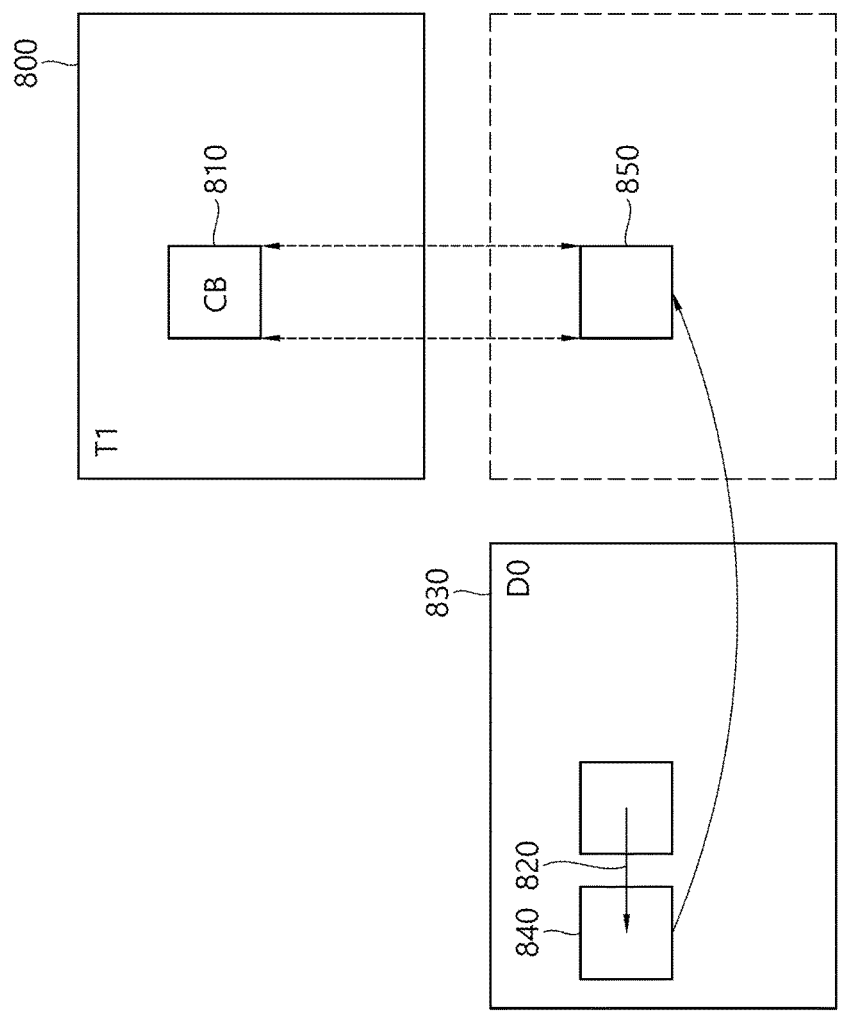
FIG. 8 is a diagram schematically illustrating a procedure of correcting a disparity vector induced from the neighboring block using a depth.

FIG. 8 is a diagram schematically illustrating a procedure of correcting a disparity vector induced from the neighboring block using a depth.

Referring to FIG. 8, a method of correcting the disparity vector of a current block (e.g., CU) is described in following (i) to (v).

(i) The encoding device and/or the decoding device may induce a disparity of a current block 810 in a current texture picture T1 800 from neighboring blocks as described above.

(ii) The encoding device and/or the decoding device may use the disparity induced in the above (i) in order to specify a location in a neighboring view corresponding to a location in a current view. That is, the encoding device and/or the decoding device may project a sample location in the current view on a depth map D0 820 of a neighboring view using the disparity 820. If the projected sample location in the current view is present outside the depth map, the encoding device and/or the decoding device allows a location projected through clipping to correspond to a boundary of the depth map. In this case, the depth map D0 830 is previously coded so that the encoding device and/or the decoding device may use depth information of a depth map D0 830.

(iii) The encoding device and/or the decoding device may assume a depth block 840 at the corresponding location on the reference view as a virtual depth block 850 of a block to be coded (current block 810).

(iv) the encoding device and/or the decoding device search a pixel having the greatest value among four corner pixel values of the virtual depth block 850.

(v) the encoding device and/or the decoding device convert the pixel value searched in the (vi) into a disparity. That is, the encoding device and/or the decoding device may convert a pixel value having the greatest value of the fourth corner pixel values of the virtual depth block 850. In this case, the encoding device and/or the decoding device may induce a disparity vector using a depth look-up table.

As shown in FIG. 8, refinement of the disparity vector induced from neighboring blocks using a virtual depth may simply refer to a depth oriented neighboring block based disparity vector (DoNBDV).

As illustrated in FIG. 8, the disparity vector obtained through the DoNBDV may be obtained using the disparity induced through the NBDV. A current block (e.g., CU) may include two or more disparity vector information through the NBDV and the DoNBDV.

If similarity between disparity vectors of the current and the neighboring block is high, a disparity vector induced from the neighboring block, that is, the NBDV may be well express a disparity vector of the current block. Meanwhile, if similarity between disparity vectors of the current block and the neighboring block is low, a disparity vector corrected to a depth value, that is, the DoNBDV may well express a disparity vector of a current block. Accordingly, during a 3D video compression/restoration procedure, coding efficiency can be increased by selectively using one from a plurality of disparity vectors by CUs.

Disparity vector information of a CU unit may be used in an inter-view prediction technique such as inter-view motion parameter prediction (IvMC), advanced residual prediction (ARP), and view synthesized prediction (VSP). With respect to the respective predictions, the encoding device and/or the decoding device may fixedly use the NBDV or the DoNBDV, and may selectively use information of a disparity vector having higher coding efficiency from the NBDV or the DoNBDV.

For example, the encoding device and/or the decoding device may use one having greater magnitude of the NBDV and the DoNBDV without additional information (e.g., flag indicating which disparity vector is used) as a disparity vector of a current block. Alternatively, the encoding device and/or the decoding device may use one having smaller magnitude of the NBDV and the DoNBDV without additional information (e.g., flag indicating which disparity vector is used) as the disparity vector of a current block.

Moreover, the encoding device and/or the decoding device may selectively use the NBDV or the DoNBDV according to a location relationship between a reference view and a current view.

In addition, the encoding device and/or the decoding device may directly send disparity vector information used in encoding the current block using flag information. For example, the encoding device may transmit a flag indicating whether to use the NBDV or the DoNBDV for decoding a current block. In this case, the decoding device may decode the current block using a disparity vector indicated by the flag.

As described above, since the disparity vector having different characteristics according to the inducing method is obtained, a disparity vector of the current block may be efficiently predicted. For example, the disparity vector of the current block may be more exactly induced by taking into consideration both of the NBDV and the DoNBDV.

That is, an improved disparity vector may be induced as a disparity vector based on the disparity vector induced through the NBDV procedure and the disparity vector induced through the DoNBDV. The inducing procedure of the improved disparity vector is illustrated in following ① to ⑤.

① As described above, the encoding device and/or the decoding device may induce a disparity vector $DV_{NBDV}$ from neighboring blocks of a current block (e.g., a CU) through the NBDV procedure.

② As described above, the encoding device and/or the decoding device may induce a disparity vector $DV_{DoNBDV}$ of a current block through the DoNBDV procedure using a depth value.

③ In this case, unlike the NBDV procedure, the encoding device and/or the decoding device may configure a disparity vector candidate group $DV_{NBDV}(x)$ by inducing a disparity vector from all available blocks among the whole candidate blocks without terminating a process even if a first disparity vector is induced in the NBDV procedure. In this case, the x represents an integer number ranging 0≤x≤N, and the N represents a number of the induced disparity vectors.

④ The encoding device and/or the decoding device may calculate an absolute value difference between the disparity vector candidate group $DV_{NBDV}(x)$ and $DV_{DoNBDV}$ induced through the NBDV procedure.

⑤ The encoding device and/or the decoding device may configure a disparity vector having the smallest absolute value difference from $DV_{DoNBDV}$ among the disparity vector candidate group $DV_{NBDV}(x)$ as a new disparity vector disparity vector $DV_{NBDV\_NEW}$ as illustrated in an equation 1.

$$idx = \text{ArgMin}[|DV_{DoNBDV}| - |DV_{NBDV}(x)|],$$
$$x=0 \ldots \#\text{Cand}]DV_{NBDV\_NEW} = DV_{NBDV}(idx) \quad <\text{Equation 1}>$$

The encoding device and/or the decoding device may use the $DV_{NBDV\_NEW}$ obtained by methods of ① to ⑤ instead of the $DV_{DoNBDV}$. The encoding device and/or the decoding device may use the $DV_{DoNBDV}$ without change and without using the $DV_{NBDV\_NEW}$.

For example, when the $DV_{NBDV\_NEW}$ is different from the $DV_{NBDV}$, the encoding device and/or the decoding device may select one from the above (1) and (2) to use the selected one as a disparity vector or a motion vector predictor applied to generate a prediction sample of a current block: (1) one selected from the $DV_{NBDV\_NEW}$ and the $DV_{DoNBDV}$. (2) $DV_{NBDV}$ Meanwhile, a memory capacity of the encoding device and/or the decoding device may be considered during a procedure of inducing the disparity vector from the neighboring blocks.

For example, in the NBDV process, as described above, when the neighboring blocks do not include the disparity vector, the encoding device and/or the decoding device may use a disparity vector of a block encoded by a DV-MCP (that is, IvMC) around the current block as a candidate disparity vector with respect to the current block.

Figure 9:
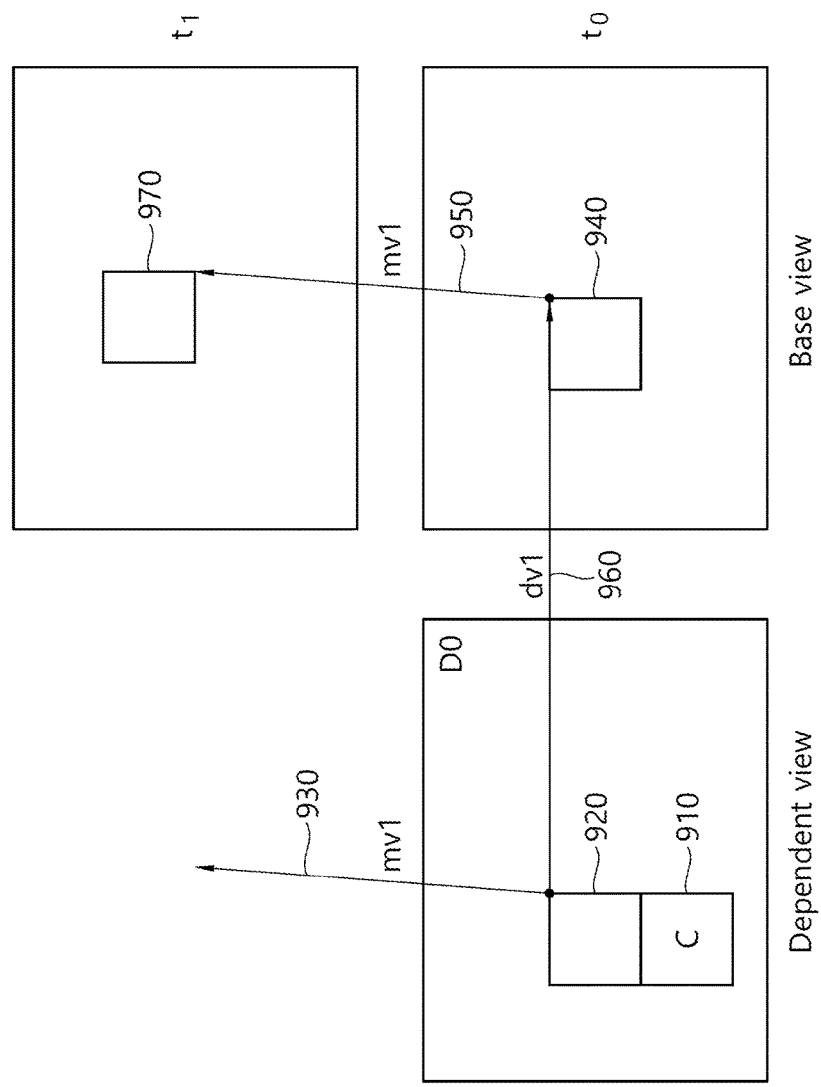
FIG. 9 is a diagram schematically a method of searching an NBDV using a DV-MCP block.

FIG. 9 is a diagram schematically illustrating a method of searching an NBDV using a DV-MCP block.

Referring to FIG. 9, a motion vector mv1 930 of a neighboring block 920 may be induced from a corresponding block 940 of a reference base view of a current block C 910. The motion vector 930 of the neighboring block 920 may be configured similar to a motion vector mv1 950 of the corresponding block 940. The motion vector mv1 950 of the corresponding block 940 may specify a reference block 970 in a picture at another time t1. The corresponding block 940 may be specified according to a disparity vector dv1 960.

In an example of FIG. 9, the encoding device and/or the decoding device may use a dv1 960 as a candidate for inducing an NBDV of a current block C 910. To this end, the encoding device and the decoding device should store disparity vector information (e.g., information on the dv1 of FIG. 9) of a block coded (encoded/decoded) to a DV-MCP during the encoding/decoding procedure.

However, in order to store the disparity vector, extension of a memory space is required and various problems may be caused upon implementing hardware. Accordingly, a coding efficiency can be further increased by greatly setting a unit for storing disparity vector information of a block coded to a DV-MCP.

Disparity vector information of a current DV-MCP block is stored in a CU unit. Since a minimum size of the CU is 8×8 pixels, implementation of hare should be considered even a case of storing information of the disparity vector every 8×8 blocks. That is, a memory size should be currently designed to store a disparity vector every 8×8 blocks.

In the meantime, when the disparity vector is stored in a 16×16 pixel unit, a memory size for storing the disparity vector information of the DV-MCP block may be reduced to a quarter. Moreover, when the disparity vector is stored in the 16×16 pixel unit, a disparity vector value of the DV-MCP block may extend a neighboring vector. This may further propagate the NBDV value as compared with that of the related art.

The present invention is not limited to storing the disparity vector in the 16×16 pixel unit. The disparity vector may be stored in a size unit of 16×16 pixels or greater. In this case, a required memory size may be further reduced.

In addition, the encoding device and/or the decoding device may store the disparity vector in a non-square unit such as 32×16 pixels and 16×8 pixels instead of a square unit.

Together with a method of reducing a memory for storing a disparity vector, a method of reducing a transmission amount of information may be considered in order to increase the coding efficiency.

In order to reduce the transmission amount of information on a motion vector, the encoding device and the decoding device may induce a motion vector predictor mvp=(mvpx, mvpy) using motion information of the coded units (e.g., a CU or a PU). The encoding device may use a method of transmitting only a motion vector difference between a motion vector of a current block and a motion vector predictor. The decoding device calculates a motion vector predictor of a current block (current processing unit, for example, a CU or a PU) using motion information of other decoded units (e.g., a CU or a PU), and acquires a motion vector value with respect to a current block using the transmitted motion vector difference.

Hereinafter, embodiments of predicting a motion vector with respect to a current block will be described.

Figure 10:
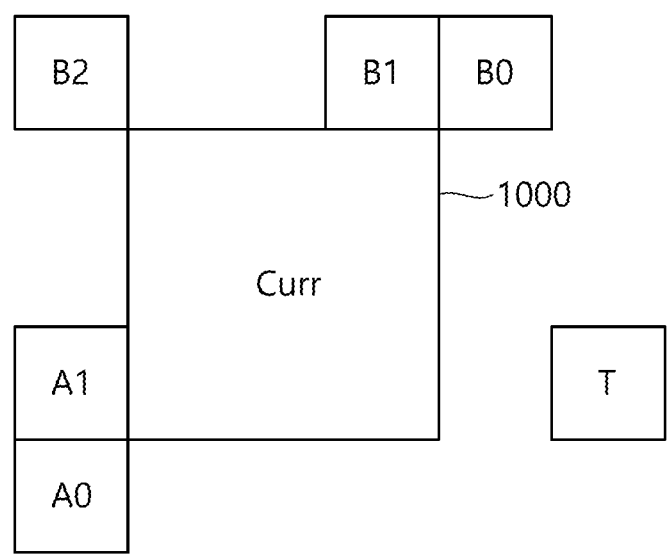
FIG. 10 is a diagram schematically illustrating an example of neighboring blocks which may be used for predicting a motion vector.

FIG. 10 is a diagram schematically illustrating an example of a neighboring block which may be used for predicting a motion vector.

FIG. 10 illustrates an example of specifying neighboring blocks of a current block.

Referring to FIG. 10, locations of spatial neighboring blocks A0, A1, B0, B1, and B2 of a current block 1000 may be specified based on a location of the current block 1000. For example, the spatial neighboring blocks may include a lower left block A0 of a current block, a left block A1 of the current block, an upper right block B0 of the current block, an upper block B1 of the current block, and an upper right block B2 of the current block.

A temporal neighboring block T may be specified in addition to the spatial neighboring blocks of the current block 1000.

Figure 11:
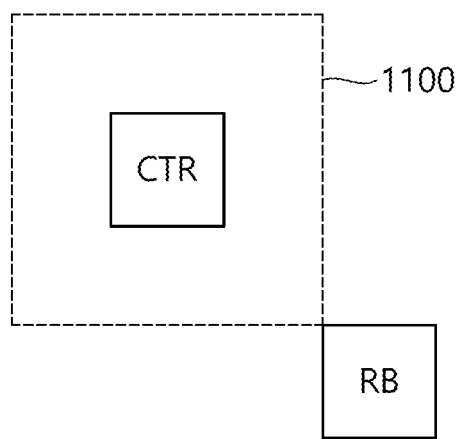
FIG. 11 is a diagram schematically illustrating a temporal neighboring block of a current block.

FIG. 11 is a diagram schematically illustrating a temporal neighboring block of a current block. The temporal neighboring block T of the current block shown in FIG. 1O may be specified based on a location 1010 of a current block at a collocated picture designated when a current picture or a current slice is decoded.

Referring to FIG. 11, a center block CTR and a right bottom block RB may be specified as a temporal neighboring block of a current block. When the right bottom block RB is available, the lower right block RB is used as a temporal neighboring block of the current block. When the lower right block RB is not available, a center block CTR may be used as a neighboring block of a current block.

Neighboring blocks of the current block shown in FIG. 10 and FIG. 11 are blocks where decoding is previously ended upon decoding the current block, and correspond to neighboring blocks of a current block illustrated in FIG. 7.

The encoding device and the decoding device may configure a motion vector predictor (MVP) list by motion vectors of neighboring blocks of a current block (e.g., a coding block or a prediction block).

The encoding device may transmit a difference value between an index value indicating a motion vector predictor having the best coding efficiency on an MVP list and a motion vector to be applied upon using a predictor indicated by the index.

The decoding device may receive a difference value between an index value indicating whether to use a certain motion vector predictor on a MVP list and a motion vector. The decoding device may restore a motion vector to be used in a current block using a motion vector predictor indicated by the index and the difference value. For example, the decoding device may induce a motion vector of the current block based on a sum of the motion vector predictor and the difference value.

Meanwhile, when a multi-view video is coded and a currently coded picture (that is, a current picture) is a picture of a dependent view, the encoding device and the decoding device may use a disparity vector of a reference view where decoding is terminated. For example, the encoding device and/or the decoding device may add a motion vector predictor using a motion vector of a corresponding block designated by a disparity vector of a reference view. In this case, the encoding device and/or the decoding device may generate a motion vector predictor in a following scheme according to a coding mode of a corresponding block.

(1) when a reference picture of a current picture is a temporal reference picture which is a picture of the same view as that of the current picture, (1-i) (1-i) when a corresponding block is MCP coded, the encoding device and/or the decoding device may add a motion vector of a corresponding block to a MVP list as candidate motion vector predictor (MVP) of a current block. In this case, when a POC value POC1 of a reference picture of the corresponding block is different from a POC value POC2 of a reference picture of the current block, a motion vector of the corresponding block may be additionally scaled. When a POC of the current picture is a POC0, a motion vector MV of a corresponding block may adjust a size of the motion vector as expressed by MV*((POC2−POC0)/(POC1−POC0)).

(1-ii) when a corresponding block is not MCP coded, a motion vector predictor may be generated as follows.

(1-ii-1) the encoding device and/or the decoding device may use a zero vector, that is, (0,0) as a motion vector predictor.

(1-ii-2) the encoding device and/or the decoding device may search a MCP coded block from neighboring blocks of the corresponding block to use the searched MCP coded block as a motion vector predictor. In this case, the encoding device and/or the decoding device may sequentially search neighboring blocks of a corresponding block in various orders to search a MCP coded block. For example, the encoding device and/or the decoding device may search the neighboring blocks in the order of A1, B1, A0, B0, B2, col-CTR, and col-RB or in the order of A0, A1, B0, B1, B2, col-CTR, and col-RB.

(2) when a reference picture of a current picture is an inter-view reference picture which is a picture of a view different from that of the current picture, the encoding device and/or the decoding device may use a disparity value predicted through a disparity vector inducing process. For example, since a vertical component of the disparity vector is 0, the encoding device and/or the decoding device may add (disp, 0) to a MVP list as a candidate motion vector predictor using a disparity value disp predicted through the disparity vector inducing process.

In a case of an advanced motion vector prediction (AMVP) to predict a motion vector, since an index refIdx is firstly decoded before an index value of a MVP list is decoded, it may be known whether a reference picture is a reference picture of the same view or a reference picture of a different view. An efficient motion vector predictor may be induced using the above.

For example, when the reference picture of a current block is the reference picture of the same view, the encoding device and/or the decoding device may find a corresponding block of a neighboring view using a disparity value induced from neighboring blocks as described above. The encoding device and/or the decoding device may confirm whether the corresponding block of a neighboring view is coded to an MCP. In the MCP coding case, the encoding device and/or the decoding device may add a motion vector of the corresponding block to an MVP list as one candidate of a motion vector predictor of a current block.

Further, when the reference picture of the current block is the reference picture of a different view, the encoding device and/or the decoding device may add (disp,0) to the MVP list as a candidate motion vector predictor using a disparity value disp induced from the neighboring blocks.

As described above, when a reference picture of the current block is a picture of a different view, the MVP list may be configured in various schemes. Hereinafter, embodiments for configuring the MVP list will be described when the current block may refer to a picture of a different view. In a following description, neighboring blocks are neighboring blocks shown in FIG. 10 and FIG. 11.

<Method 1 of Configuring a MVP List> When a reference picture of a current block is a picture of a different view, a motion vector predictor with respect to a current block may mean a disparity vector. Accordingly, the encoding device and/or the decoding device may refine a disparity vector searched from neighboring blocks using a base view depth value. That is, the encoding device and/or the decoding device may refine a disparity vector induced by an NBDV procedure through a DoNBDV procedure.

Figure 12:
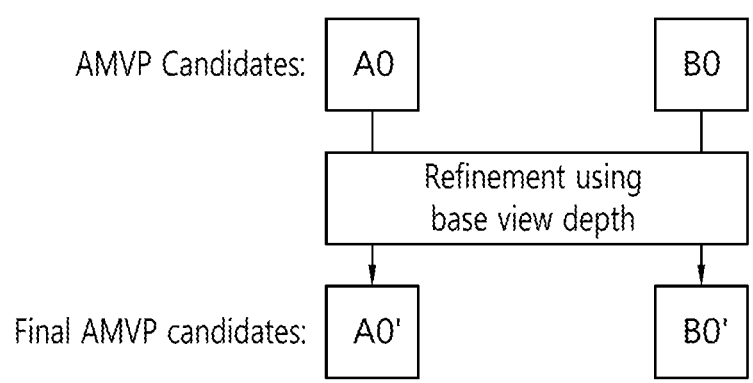
FIG. 12 is a diagram schematically illustrating an example of configuring an MVP list according to the present invention.

FIG. 12 is a diagram schematically illustrating an example of configuring an MVP list according to the present invention. Referring to FIG. 12, the encoding device and/or the decoding device refine the disparity parity induced by the NBDV procedure through the DoNBDV procedure. An example of FIG. 12 illustrates that a disparity vector induced through an NBDV procedure is induced from neighboring blocks A0 and B0, and the induced disparity vector is modified through the DoNBDV.

An example of FIG. 12 illustrates an example of using all of spatial neighboring blocks A0, A1, B0, B1, and B2. However, when only partial spatial neighboring blocks are available, an example of FIG. 12 is equally applicable. For example, when only the A1 and the B1 are used for the NBDV procedure, the encoding device and/or the decoding device may refine a disparity vector induced through an NBDV procedure as a motion vector predictor (AMVP)

candidate included in the MVP list through a DoNBDV to use the refined disparity vector as a final AMVP candidate.

<Method 2 of Configuring a MVP List>

When a reference picture of a current block is a picture of a different view, a motion vector predictor with respect to a current block may mean a disparity vector. Accordingly, when the MVP list is not filled with a maximum number of candidate motion vector predictors with respect to a current block, the encoding device and/or the decoding device may update a disparity vector added to a current MVP list to add the updated disparity vector to the MVP list.

When there is no addable motion vector predictors, the encoding device and/or the decoding device applies a DoNBDV procedure to a zero vector to add the applied zero vector to the MVP list.

Figure 13:
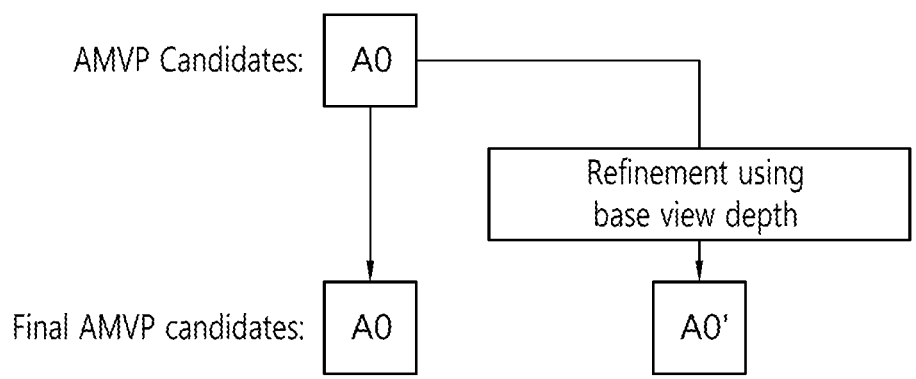
FIG. 13 is a diagram schematically illustrating another example of configuring an MVP list according to the present invention.

FIG. 3 is a diagram schematically illustrating another example of configuring an MVP list according to the present invention. Referring to FIG. 13, when a candidate is added to the MVP list after the MVP list is configured by available disparity vector(s) induced by an NBDV procedure, the encoding device and/or the decoding device may induce a new candidate disparity vector by applying a DoNBDV procedure to candidate disparity vectors added to the MVP list.

An example of FIG. 13 is illustrative purpose only and illustrates a case where an available disparity vector is induced from a neighboring block A0 through an NBDV procedure. The maximum number of candidate disparity vectors in the MVP list is 2. The encoding device and/or the decoding device may induce a refined candidate disparity vector A0' by applying a DoNBDV procedure to a disparity vector A0 induced from A0.

In an example of FIG. 13, a method of using only two neighboring blocks A1 and B1 among the spatial neighboring blocks is equally applicable. When the neighboring block B1 is not available, the encoding device and/or the decoding device may configure a final AMVP candidate (MVP list) by a disparity vector A1 induced from a block A1 and a disparity vector A1' induced by applying a DoNBDV to the disparity vector A1.

<Method 3 of Configuring a MVP List>

When a reference picture of a current block is a picture of a different view, a motion vector predictor with respect to a current block may mean a disparity vector. Accordingly, the encoding device and/or the decoding device may configure a MVP list by a disparity vector obtained through a NBDV procedure and a disparity vector updated through a DoNBDV procedure. In this case, as the disparity vector induced from neighboring blocks, a disparity vector previously induced during a previous encoding or decoding procedure or a disparity vector induced upon encoding/decoding the current block may be used.

Figure 14:
FIG. 14 is a diagram schematically illustrating another example of configuring an MVP list according to the present invention.

FIG. 14 is a diagram schematically illustrating another example of configuring an MVP list according to the present invention. Referring to FIG. 14, final AMVP candidates to be used in a current block, that is, a MVP list is configured by a NBDV and a DoNBDV induced from a neighboring block instead of a motion vector of the neighboring block.

<Method 4 of Configuring a MVP List>

When a reference picture of a current block is a picture of a different view, a motion vector predictor with respect to a current block may mean a disparity vector. Accordingly, when the MVP list is not filled with a maximum number of candidate motion vector predictors with respect to a current block, the encoding device and/or the decoding device may add a disparity vector induced through a NBDV procedure to the MVP list. Further, the encoding device and/or the decoding device may update a disparity vector through the DoNBDV procedure to add the updated disparity vector to the MVP list.

FIG. 15 is a diagram schematically illustrating another example of configuring a MVP list according to the present invention. FIG. 15 is illustrative purpose and illustrates a case where the MVP list is configured by two final candidate motion vector predictors similar to the above embodiment.

Referring to FIG. 15, when a motion vector A0 of an A0 of the neighboring blocks is induced as one final candidate so that all necessary candidates are not filled, the encoding device and the decoding device may add a disparity vector induced through a NBDV procedure from neighboring blocks or a disparity vector induced through a DoNBDV procedure to a MVP list.

In this case, when a disparity vector with respect to a current block is not induced, the encoding device and the decoding device may add a disparity vector updated by performing a DoNBDV procedure for a zero disparity vector to the MVP list.

Further, when there is no disparity with respect to a current block, the encoding device and the decoding device may not fill an empty position of a list. That is, when there is a disparity vector induced from the neighboring blocks through the NBDV, the encoding device and the decoding device may compensate a disparity vector induced by the NBDV procedure and a disparity vector updated through the DoNBDV procedure as a final AMVP candidate.

<Method 5 of Configuring a MVP List>

Figure 16:
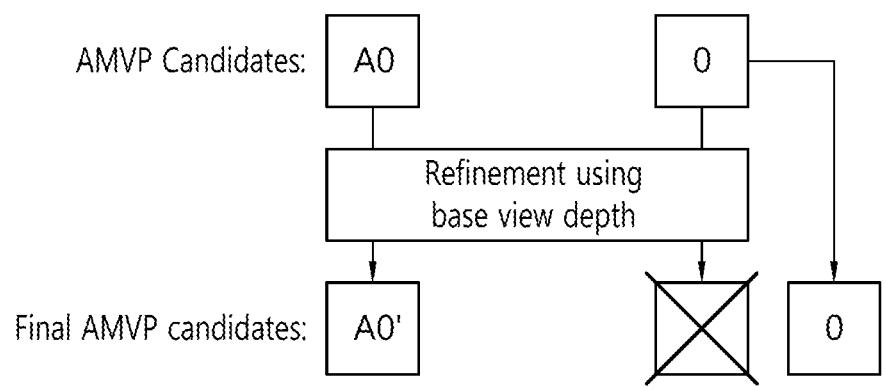
FIG. 16 is a diagram schematically illustrating another example of a method for inducing a MVP list according to the present invention.

FIG. 16 is a diagram schematically illustrating another example of a method for inducing a MVP list according to the present invention. FIG. 16 illustrates an example of a case where an MVP list is configured by two candidate motion vector predictors.

Referring to FIG. 16, when one available candidate (AMVP candidate) of the MVP list is induced from a motion vector of a neighboring block, the encoding device and/or the decoding device does not add a 0 vector but may refine the 0 vector to a DoNBDV to add the refined 0 vector to the MVP list.

For example, as shown in FIG. 16, it is assumed that one available motion vector is induced from the neighboring block (that is, one available motion vector is induced from only a block A0). When a reference picture of a current block is a picture of a different view, a motion vector predictor with respect to a current block may mean a disparity vector so that a 0 vector may be used as a 0 disparity vector. The encoding device and/or the decoding device may update a zero disparity vector through a DoNBDV procedure to add the updated zero disparity vector to the MVP list.

<Method 6 of Configuring a MVP List>

Figure 17:
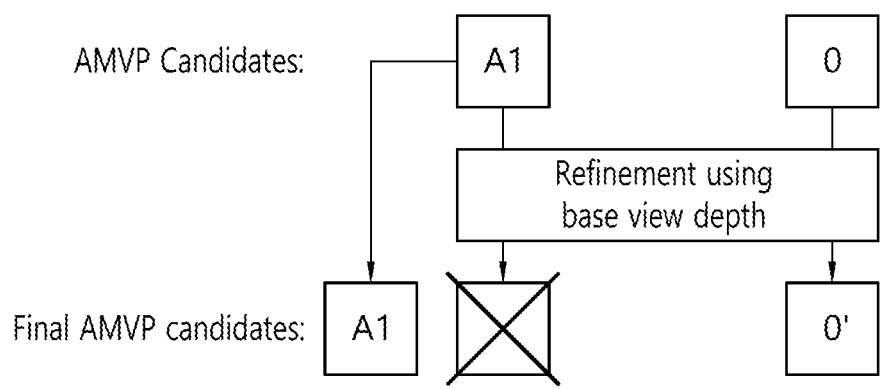
FIG. 17 is a diagram schematically illustrating another example of configuring an MVP list according to the present invention.

FIG. 17 is a diagram schematically illustrating another example of configuring an MVP list according to the present invention.

When a reference picture of a current block is a picture of a different view, a motion vector predictor with respect to a current block means a disparity vector. Accordingly, the encoding device and/or the decoding device may use a zero vector added when there is no candidate available motion vector predictor mvp as a zero disparity vector.

As illustrated in an example of FIG. 17, when the zero vector is included in the MVP list, the encoding device and/or the decoding device may replace the zero vector with a disparity vector updated through the DoNBDV procedure.

Figure 18:
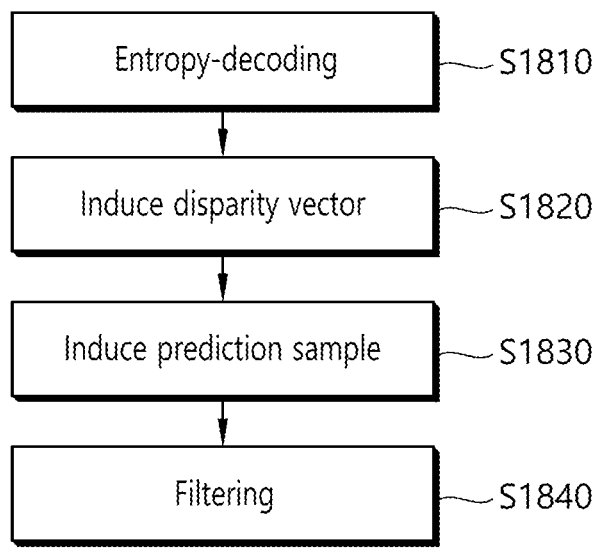
FIG. 18 is a diagram schematically illustrating an operation of a decoding device according to the present invention.

FIG. 18 is a diagram schematically illustrating an operation of a decoding device according to the present invention.

Referring to FIG. 18, a decoding device may entropy-decode a bitstream (S1810). The decoding device may parse the bitstream to output video information required to decode a current block.

The video information may include information for specifying neighboring blocks (e.g., information indicating a collocated picture and the like), information indicating a reference view, and information indicating whether a depth is used to induce the disparity vector (information indicating whether to apply DoNBDV).

The decoding device may induce a disparity vector based on the video information (S1820). The decoding device may induce a first disparity vector based on neighboring blocks of a current block included in the same view using the video information, may induce a second parity vector using the first disparity vector and a reference view depth, and may induce a third disparity vector using a difference between the first parity vector and the second disparity vector. For example, the first disparity vector may correspond to a disparity vector $DV_{NBDV}$ induced through a NBDV procedure, the second disparity vector may correspond to a disparity vector $DV_{DoNBDV}$ induced through a DoNBDV procedure, and the third disparity vector may correspond to a disparity vector $DV_{NBDV\_NEW}$ induced based on a difference between the DVNBDV and the DVDoNBDV.

Detailed contents of a method of inducing the disparity vector is described above.

The decoding device may induce a prediction sample of a current block using an induced disparity vector (S1830). The decoding device may induce the prediction sample of the current block using one of the first disparity vector, the second disparity vector, and the third disparity vector.

For example, the decoding device may configure a candidate MVP list using motion vectors including the first disparity vector, the second disparity vector, and the third disparity vector. The decoding device may induce a motion vector of a current block based on a sum of a motion vector predictor selected from a candidate MVP list and a transmitted motion vector difference value. A motion vector difference value is a difference value between the motion vector predictor and a motion vector of the current block, which may be calculated from an encoding device and may be transmitted to the decoding device together with information indicating a reference picture.

The decoding device may induce a prediction sample of a current block based on sample values which are specified by a motion vector in a reference picture. A method of configuring a candidate MVP list or a method of inducing a prediction sample is described above.

The decoding device may apply filtering to a reconstructed picture using the prediction sample (S1840). The decoding device may induce the reconstructed sample of the current block by adding a residual sample to the prediction sample. The residual sample may be entropy-encoded from the encoding device and the entropy-encoded residual sample may be transmitted to the decoding device. The decoding device may induce a residual sample value based on the entropy-decoding.

The decoding device may apply deblocking filtering or SAO to the reconstructed picture. Presence of applying the filtering may be signaled to the decoding device from the encoding device.

Although FIG. 18 illustrates the decoding device, steps S1820 to S1840 are operated in a decoding loop in the encoding device, and are equally applicable to the encoding device.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A video decoding apparatus for decoding a multi-view video, the apparatus comprising:
    an entropy decoding unit configured to derive video information required for decoding a current block by entropy-decoding a bitstream;
    a memory configured to store pictures referred to decode the current block;
    a prediction unit configured to derive a first disparity vector based on a disparity vector of a neighboring block of the current block in the same view by using the video information, to derive a second disparity vector by using the first disparity vector and a reference view depth, to derive disparity vectors of neighboring blocks of the current block other than the neighboring block of the current block, to select a disparity vector having a size of the smallest difference from a size of the second disparity vector among the disparity vectors as a third disparity vector, and to generate a prediction sample of the current block by using one of the first disparity vector, the second disparity vector, and the third disparity vector; and
    a filter unit configured to apply filtering to a current picture which has been reconstructed using the prediction sample of the current block,
    wherein the second disparity vector is generated based on a maximum depth value among corner depth values of a corresponding block in the reference view, and
    wherein the corresponding block is a block indicated by the first disparity vector at corresponding position of the current block in the reference view.

2. The video decoding apparatus of claim 1, wherein the prediction unit configures a MVP(motion vector predictor) list including the first disparity vector, the second disparity vector, and the third disparity vector as MVP candidates,
    selects a MVP candidate of the current block based on the MVP list and the video information, and
    derives a motion vector of the current block based on the MVP candidate.

3. The video decoding apparatus of claim 1, wherein the prediction unit uses one from the second disparity vector and the third disparity vector to generate the prediction sample.

4. The video decoding apparatus of claim 1, wherein the memory stores disparity vector used to generate the prediction sample in one of a 16×16 pixel block unit, a 32×32 pixel block unit, or a 64×64 pixel block unit.

5. The video decoding apparatus of claim 1, wherein the memory stores disparity vector used to generate the prediction sample in a non-square block unit.

6. The video decoding apparatus of claim 2, wherein the prediction unit configures the MVP list by using zero disparity vectors when the MVP list does not include a maximum number of MVP candidates for the current block.

7. A video decoding method for decoding a multi-view video by a decoding apparatus, the method comprising:

deriving, by the decoding apparatus, video information required for decoding a current block by entropy-decoding a bitstream;

deriving, by the decoding apparatus, a first disparity vector based on a disparity vector of a neighboring block of the current block in the same view by using the video information, deriving, by the decoding apparatus, a second disparity vector by using the first disparity vector and a reference view depth, deriving, by the decoding apparatus, disparity vectors of neighboring blocks of the current block other than the neighboring block of the current block;

selecting, by the decoding apparatus, a disparity vector having a size of the smallest difference from a size of the second disparity vector among the disparity vectors as a third disparity vector;

generating, by the decoding apparatus, a prediction sample of the current block by using one of the first disparity vector, the second disparity vector, and the third disparity vector; and applying, by the decoding apparatus, filtering to a current picture which has been reconstructed using the prediction sample of the current block, wherein the second disparity vector is generated based on a maximum depth value among corner depth values of a corresponding block in the reference view, wherein the corresponding block is a block indicated by the first disparity vector at corresponding position of the current block in the reference view.

8. The video decoding method of claim 7, wherein the generating the prediction sample of the current block comprises:

configuring a MVP(motion vector predictor) list including the first disparity vector, the second disparity vector, and the third disparity vector as MVP candidates, selecting a MVP candidate of the current block based on the MVP list and the video information, and deriving a motion vector of the current block based on the MVP candidate.

9. The video decoding method of claim 7, wherein the memory stores disparity vector used to generate the prediction sample in one of a 16×16 pixel block unit, a 32×32 pixel block unit, or a 64×64 pixel block unit.

* * * * *